B. S. PARKER.

Dies for Manufacturing Ox-Shoes.

No. 6,113. Reissued Nov. 3, 1874.

WITNESSES:

Jas. E. Hutchinson.

John R. Young

B. S. Parker INVENTOR.

by his atty

Theo. Wm. Clark

THE GRAPHIC CO. PHOTO-LITH. 39 & 41 PARK PLACE, N.Y.

UNITED STATES PATENT OFFICE.

BOWDOIN S. PARKER, OF GREENFIELD, MASSACHUSETTS.

IMPROVEMENT IN DIES FOR MANUFACTURING OX-SHOES.

Specification forming part of Letters Patent No. 123,927, dated February 20, 1872; reissue No. 6,113, dated November 3, 1874; application filed December 22, 1873.

*To all whom it may concern:*

Be it known that I, BOWDOIN S. PARKER, of Greenfied, in the county of Franklin and State of Massachusetts, have invented a new and useful Improvement in Dies for the Manufacture of Ox-Shoes; and I do hereby declare the following to be a clear, full, and exact description of the same, reference being had to the accompanying drawing, in which—

Figure 1:
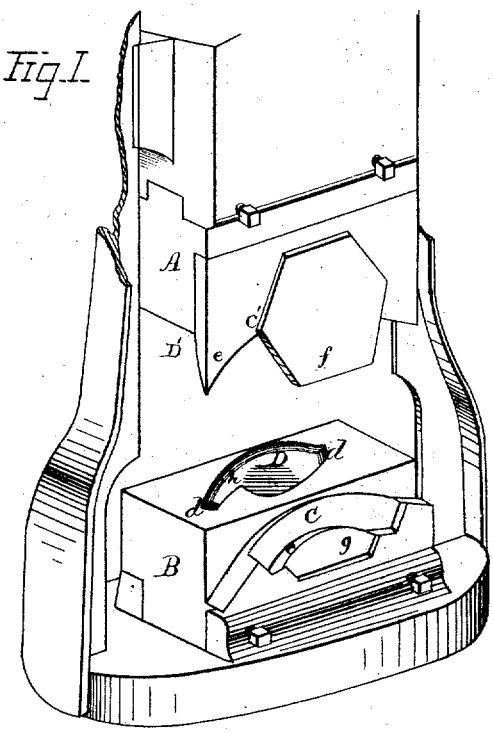
Figure 2:
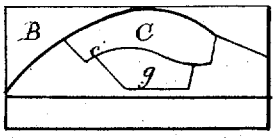
Figure 3:
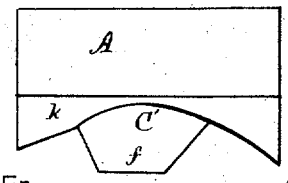
Figure 4:
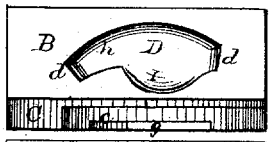
Figure 5:
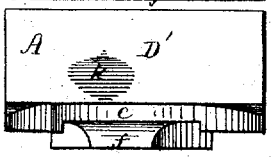

Figure 1 is a perspective view of the dies which I have devised for forging ox-shoes, mounted in a drop-press; Fig. 2, elevation, face of roughing female die; Fig. 3, elevation, face of roughing male die; Fig. 4, plan, face of finishing female die; Fig. 5, plan, face of finishing male die.

My invention relates to an improvement in manufacturing ox-shoes; and it consists in dies suitably arranged and adjusted to swage the blank into form, and finish it under a drop-press, trip-hammer, or steam-hammer.

On a single pair of blocks, A B, I form two male and two female dies, as shown particularly in Fig. 1. The dies C C′ are the rough shaping-dies. They are arranged upon the sides of the respective blocks A B, in order to effect a convenient application of a blow edgewise upon the rough blank, so as to bend the same to the curvature of a finished ox-shoe. The die C is composed of a ledge, *c*, on the front side of block B, having its upper surface curved upward in its middle portion, corresponding somewhat to the curvature of the inner edge of an ox-shoe; and the die C′ is formed by a plate, *e*, placed along the front side of the die-block A, and projected downward below the lower face of said block to a distance sufficiently far to meet properly the female die C. The edge of the plate *e*, which composes the male die, is curved concave to the die C, and exactly to correspond to the curvature of the outer edge of the ox-shoe. In order to correct any slight deviation from truth of stroke, consequent upon looseness of the guides or other causes, the guide-lip *f* is placed on the outer side of the male die C′ and projects downward therefrom, so as to strike into the recess *g* on the outer side of the die C. The guide-lip *f* is narrower at its point than at its base, and is also chamfered from the back, so as to reduce the point in thickness. It is then sure to enter the recess *g* and bring the dies to correct positions before the stroke is ended. The guide-lip *f* will also force the blank back into the die, if, at the time of stroke, it should not be seated with complete accuracy. The die D is cut into the upper face of the block B, and is designed to represent in reverse the exact configuration of the lower face of an ox-shoe. At each end of said die there may be depressions *d*, into which the metal of the blank will be forced, to form the calks of the shoe, and a projecting rib, *h*, along the outer edge, and parallel thereto, will form the grooves in which the nail-heads will be seated when the shoe is secured in place upon the foot of the ox. At the expanded part *i* the shoe is made thin, and only serves as a protection to the soft part of the hoof. The male die D′ is mainly the flat surface of the block A. A slight convex projection, *k*, is preferably made at a point corresponding with the thin portion *i*, to make the shoe slightly concave on its upper surface at that point, because it is not desirable that it should press upon the foot, except around its horny edge. The blanks are cut from bars of suitable dimensions, and when heated are placed in the die C to be bent edgewise, roughly, to the form of the ox-shoe, and, when so bent, the blank is laid in die D, and, being struck by die D′, the shoe is formed and finished.

But a single heating of the blank is required, and with the dies as described, operated by a drop, steam, or trip-hammer, shoes may be produced as perfect in every respect as those forged by hand, and with much greater uniformity as to size.

Dies have heretofore been used in making ox-shoes. The patent of H. Colburn of April 26, 1870, describes a sort of dies so applied for forming the under surface, the upper surface being shaped by the flat face of the hammer without the depression made by the projection *k* on the male die. In the female die, too, there are the following distinctions: No recesses are left for calks as in my dies. It is open at the heel, and therefore the iron is not as well compressed and shaped as in mine, where it is forced to fill a box, and the part that forms the web of the shoe, as well as the part exterior to the outer edge of the shoe, rests on springs and plays up and down around a curved upright flange sharpened and presenting upward points at the top to produce the fullering and nail-holes. This is extremely objectionable in construction, as in the use of dies the iron throws out feathers along any line of joining, and would wedge, and the fullering-flange be very liable to break.

In ox-shoes calks may be turned on the shoe, while in horseshoes this must be done by hand. It is important, therefore, to turn the calks in the dies, particularly the heel-calks, which I have provided for. When it is necessary to cut or shape a size of ox-shoe to fit a peculiar foot, in most cases lateral shaping is all that is necessary; but if cutting is required, it is done at the toe, and not at the heel, as in horses. These particulars I consider essential, and have made them subjects of my claims.

Having described my invention, what I claim as new is—

1. The swaging-dies C C′ D D′, for forming ox-shoes, substantially as described.

2. The male die D′, with its convex projection *k*, substantially as and for the purpose described.

3. The female die D, formed with depressions for calks *d d* at the ends of the intaglio, and with rib *h*, substantially as described.

BOWDOIN S. PARKER.

Witnesses:

ASHLEY HOLLAND,
AUSTIN DE WOLF.